United States Patent
Fischer et al.

(10) Patent No.: US 11,482,921 B2
(45) Date of Patent: Oct. 25, 2022

(54) ACTIVE HARMONICS CANCELLATION

(71) Applicant: WiTricity Corporation, Watertown, MA (US)

(72) Inventors: Marcel Fischer, Boniswil (CH); Mircea-Florian Vancu, Schlieren (CH); Hans Peter Widmer, Wohlenschwil (CH); Prasanth Venugopal, Munich (DE)

(73) Assignee: WiTricity Corporation, Watertown, MA (US)

( * ) Notice: Subject to any disclaimer, the term of this patent is extended or adjusted under 35 U.S.C. 154(b) by 269 days.

(21) Appl. No.: 16/402,859

(22) Filed: May 3, 2019

(65) Prior Publication Data

US 2020/0350816 A1 Nov. 5, 2020

(51) Int. Cl.
*H02M 1/12* (2006.01)
*H02J 50/90* (2016.01)
(Continued)

(52) U.S. Cl.
CPC ............ *H02M 1/126* (2013.01); *B60L 53/12* (2019.02); *H02J 7/025* (2013.01); *H02J 50/10* (2016.02); *H02J 50/90* (2016.02)

(58) Field of Classification Search
CPC .......... H02M 1/126; H02J 50/10; H02J 50/90; H02J 7/025; B60L 53/12
See application file for complete search history.

(56) References Cited

U.S. PATENT DOCUMENTS 7,961,063 B2 * 6/2011 Liu .................. H03H 7/42
 333/26
9,876,535 B2 * 1/2018 Keeling ................. B60L 53/12
(Continued)

FOREIGN PATENT DOCUMENTS

CN 109677282 4/2019
CN 109687560 4/2019
(Continued)

OTHER PUBLICATIONS

"International Search Report and Written Opinion", PCT Application No. PCT/US2020/029920, dated Jun. 29, 2020, 31 pages.
(Continued)

*Primary Examiner* — Ryan Johnson
*Assistant Examiner* — Colleen J O Toole
(74) *Attorney, Agent, or Firm* — Colby Nipper PLLC

(57) ABSTRACT

Systems and methods are described for active harmonics cancellation. A wireless charging apparatus includes a wireless-power transfer circuit comprising a wireless-power transfer coil configured to generate or couple to a magnetic field to transfer or receive power and a plurality of tuning capacitors electrically coupled to the wireless-power transfer coil. The apparatus also includes a power converter circuit electrically coupled to the wireless-power transfer circuit. Additionally, the apparatus includes a signal generation circuit different from the power converter circuit and electrically coupled to one or more nodes between capacitors of the plurality of tuning capacitors. The signal generation circuit is configured to generate and inject a signal into the wireless-power transfer circuit at the nodes between the capacitors. The signal generation circuit includes a rejection filter tuned to an operating frequency of the wireless-power transfer coil.

30 Claims, 6 Drawing Sheets

(51) Int. Cl.
  *H02J 50/10* (2016.01)
  *B60L 53/12* (2019.01)
  *H02J 7/02* (2016.01)

(56) References Cited

U.S. PATENT DOCUMENTS

| 9,929,595 | B2* | 3/2018 | Mao | H02J 50/80 |
| 2004/0196675 | A1* | 10/2004 | Cope | H02M 1/14 |
| | | | | 363/39 |
| 2020/0039368 | A1 | 2/2020 | Sieber et al. | |

FOREIGN PATENT DOCUMENTS

| EP | 3226377 | 10/2017 |
| WO | 2016037045 | 3/2016 |

OTHER PUBLICATIONS

"International Preliminary Report on Patentability", Application No. PCT/US2020/029920, dated Nov. 2, 2021, 11 pages.

\* cited by examiner

ACTIVE HARMONICS CANCELLATION

FIELD

The present disclosure relates generally to wireless power transfer, and more specifically to wireless electric vehicle charging (WEVC) systems. In particular, this disclosure relates to active harmonic cancellation in a WEVC system.

BACKGROUND

Wireless electric vehicle charging (WEVC) systems generally use a switched-mode power conversion to efficiently generate a low frequency alternating magnetic field as needed to wirelessly transfer power to an electric vehicle. Consequently, current in a base-side wireless-power-transfer coil used to generate the magnetic field, include harmonics of a switching frequency of the switched-mode power conversion. Harmonics currents are also generated at vehicle-side equipment of the WEVC system due to non-linear effects in a rectification process of the vehicle-side equipment. Although these harmonics are attenuated by a filtering effect of a tuning and matching circuit at base-side and vehicle-side equipment of the WEVC system, these harmonics currents may generate harmonics levels exceeding H-field emission limits as presently specified in standards (e.g., (CISPR), (ETSI)) up to 30 dB. Accordingly, some WEVC systems may benefit from additional harmonics mitigation means to achieve regulatory compliance.

SUMMARY

Systems and methods are described for active harmonics cancellation. In particular, harmonics levels in harmonics currents generated in the WEVC system are reduced based on a harmonics-cancellation signal generator that injects a harmonics-cancellation signal directly into a tuning section of the WEVC system.

In an example aspect, a wireless charging apparatus is disclosed. The wireless charging apparatus includes a wireless-power transfer circuit comprising a wireless-power transfer coil configured to generate or couple to a magnetic field to transfer or receive power and a plurality of tuning capacitors electrically coupled to the wireless-power transfer coil. The apparatus also includes a power converter circuit electrically coupled to the wireless-power transfer circuit. Additionally, the apparatus includes a signal generation circuit different from the power converter circuit and electrically coupled to one or more nodes between capacitors of the plurality of tuning capacitors. The signal generation circuit is configured to generate and inject a signal into the wireless-power transfer circuit at the nodes between the capacitors. The signal generation circuit includes a rejection filter tuned to an operating frequency of the wireless-power transfer coil.

In an example aspect, a base wireless charging apparatus is disclosed. The base wireless charging apparatus includes a power converter, a wireless-power-transfer coil and harmonics-cancellation circuitry. The wireless-power-transfer coil is configured to generate a magnetic field based on an electric current running through the wireless-power-transfer coil operable to transfer power to a wireless-power receiver device. The harmonics-cancellation circuitry includes a rejection filter, a coupling transformer, and a harmonics-cancellation signal generator. The rejection filter is coupled to a tuning capacitor of a wireless-power-transfer coil and tuned to an operating frequency of the wireless-power-transfer coil. The coupling transformer is coupled to both the rejection filter and the tuning capacitor, and is configured to couple a cancellation signal into the tuning capacitor of the wireless-power-transfer coil. The harmonics-cancellation signal generator is coupled to the coupling transformer and configured to generate the cancellation signal to reduce a number of harmonics components in the electric current of the wireless-power-transfer coil.

In an example aspect, a vehicle wireless charging apparatus is disclosed. The vehicle wireless charging apparatus includes a wireless-power-transfer coil, a rectifier, and harmonics-cancellation circuitry. The wireless-power-transfer coil is configured to receive a magnetic field and generating an electric current based on the magnetic field. The rectifier is coupled to the wireless-power-transfer coil and configured to convert the electric current in the receive current to a direct current for charging a battery. The harmonics-cancellation circuitry includes a rejection filter, a coupling transformer, and a harmonics-cancellation signal generator. The rejection filter is coupled to a tuning capacitor of the wireless-power-transfer coil and tuned to an operating frequency of the wireless-power-transfer coil. The coupling transformer is coupled to both the rejection filter and the tuning capacitor, and is configured to suppress a fundamental operating frequency of the wireless-power-transfer coil and couple a cancellation signal into the tuning capacitor. The harmonics-cancellation signal generator is coupled to the coupling transformer and configured to generate a cancellation signal to reduce a number of harmonics components created in the electric current of the wireless-power-transfer coil.

In an example aspect, a method for active harmonics cancellation in a wireless electric vehicle charging (WEVC) system is disclosed. The method includes measuring an electric current in a wireless-power-transfer coil of the WEVC system. The method further includes processing the electric current to identify harmonics components. The method also includes generating a harmonics-cancellation signal based on the identified harmonics components. In addition, the method includes injecting the harmonics-cancellation signal into a tuning capacitor of the wireless-power-transfer coil to reduce a number of the identified harmonics components. In aspects, generating the harmonics-cancellation signal includes generating antiphase signal components corresponding to the harmonics components and the method includes regulating the one or more antiphase signal components in the harmonics-cancellation signal by using one or more controllers.

In an example aspect, a wireless electric vehicle charging system is disclosed. The wireless electric vehicle charging system includes one or more sensors for measuring magnitude and phase of harmonics currents in a wireless-power-transfer coil. The wireless electric vehicle charging system also includes a harmonics-cancellation means for generating a cancellation signal to reduce one or more levels of the harmonics currents in the wireless-power-transfer coil. In addition, the wireless electric vehicle charging system also includes a coupling means for coupling the cancellation signal into a tuning and matching circuit of the wireless-power-transfer coil and rejecting back firing of a fundamental operating frequency of the wireless-power-transfer coil.

DETAILED DESCRIPTION

WEVC systems generally use switched-mode power conversion to efficiently generate a low frequency alternating magnetic field to wirelessly transfer power to an electric vehicle. As a result, an electrical current of base-side equipment as well as a magnetic field include harmonics of the switching frequency. Harmonics currents are also generated at vehicle-side equipment due to nonlinear effects in e.g., a rectification process. Though attenuated by a filtering effect of a tuning and matching circuit or other filtering circuitry, these harmonics currents may generate harmonics levels exceeding H-field emission limits as presently specified in standards (e.g., Comité International Spécial des Perturbations Radioélectriques (CISPR), European Telecommunications Standards Institute (ETSI)). Therefore, implementation of additional harmonics mitigation techniques can help to achieve regulatory compliance of WEVC systems.

Techniques for active harmonics cancellation are disclosed herein. In aspects, magnitude and phase of harmonics currents in a wireless-power-transfer coil are measured using one or more current or magnetic field sensors and signal processing. A cancellation signal is generated by a controller and injected at a suitable point in the tuning and matching circuit using a coupling transformer and a rejection filter to reject back firing of a fundamental operating frequency (e.g., 85 kHz) of the wireless-power-transfer coil. The controller adjusts magnitude and phase of the cancellation signal to nullify, cancel, or at least reduce harmonics currents levels in the wireless-power-transfer coil, as required to achieve regulatory compliance. These active harmonics cancellation techniques can be implemented in the base-side equipment and in the vehicle-side equipment of the WEVC system. The base-side equipment is commonly located on the ground or as the primary side for an entity that delivers power to the electric vehicle for charging. The vehicle-side equipment is located on an electric vehicle and is commonly implemented as the secondary side that receives power for charging the electric vehicle.

Figure 1:
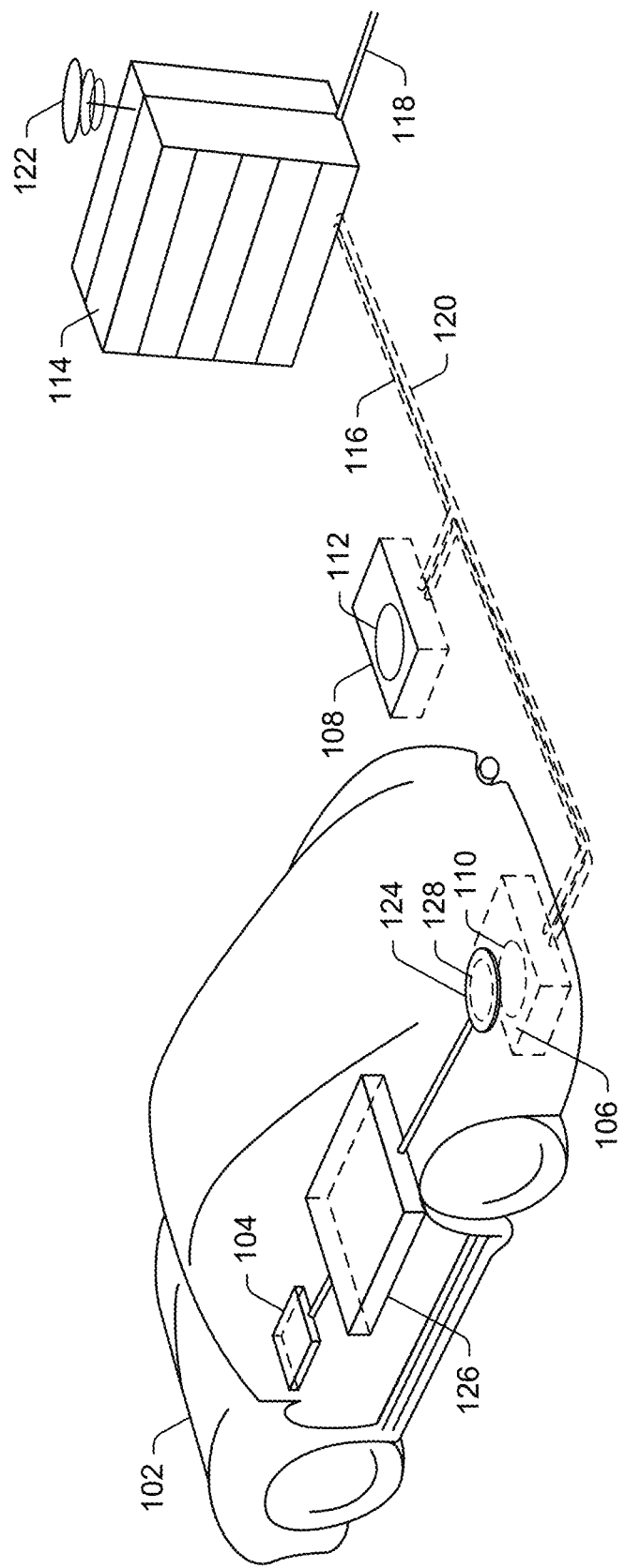
FIG. 1 is a schematic diagram of a wireless power-transfer system for charging one or more electric vehicles.

FIG. 1 is a schematic diagram of a wireless power-transfer system 100 for charging one or more electric vehicles. The wireless power-transfer system 100 enables the delivery of power to an electric vehicle 102. Such a system is also known as a wireless electric vehicle charging (WEVC) system because such systems are typically used to deliver power to charge a battery 104 in the electric vehicle 102. The power need not be delivered to the battery 104. Rather, it could be delivered to another load, such as an electric motor or other ancillary in the electric vehicle 102 while it is parked, including a heating system for cold mornings or an air conditioning system for hot days.

As shown, the system 100 allows charging while the electric vehicle 102 is parked in one of two parking spaces which each have an associated base power-transfer apparatus 106, 108. As will be described in greater detail herein after, each base power-transfer apparatus 106, 108 includes a wireless-power-transfer coils 110, 112 which is driven by associated control circuitry (not shown in FIG. 1) to generate a magnetic field above the base power-transfer apparatus 106, 108.

Depending on specific requirements of a given implementation, the control circuitry may be supplied within the base power-transfer apparatus. Alternatively, the control circuitry may be supplied partly or wholly in a unit separate from the base power-transfer apparatus 106, 108, with the base power-transfer apparatus 106, 108 including the wireless-power-transfer coil and minimal base-side control circuitry, if any, that is deemed necessary for efficient driving of the wireless-power-transfer coils 110, 112. The base power-transfer apparatuses 106, 108 are typically installed on the ground surface or buried in the ground, although they may also be supplied as removable units that may simply be placed on the ground where required and moved to another location after use.

A power supply 114 coupled to the base power-transfer apparatuses 106, 108 delivers electrical power to the base power-transfer apparatuses 106, 108 via a power link 116. As shown, the power supply 114 is connected to a power network 118. In a domestic installation, the power supply 114 may be connected to a domestic power supply in place of the power network 118.

In use, the power supply 114 and the base power-transfer apparatus 106, 108 communicate via a communications link 120 which may be a wired or wireless connection. Alternatively, or additionally depending on the specifics of the installation, communication within the system 100 may be via a wireless link 122. The wireless link 122 may optionally also communicate with, e.g., a power grid management system or other external entity via a communication backhaul to manage and control power transfer from the power grid to the system or vice versa. In the illustrated example, the power link 116 and the communications link 120 may be buried. Alternatively, e.g., in a domestic setting, they may be supplied in the form of a cable or umbilicus of connections that can be plugged into the base power-transfer apparatus 106, 108 and the power supply 114.

The electric vehicle 102 includes a vehicle power-transfer apparatus 124 and associated vehicle-side control circuitry 126, which controls the transfer of energy from a wireless-power-transfer coil 128 in the vehicle power-transfer apparatus 124 to the battery 104. The vehicle-side control circuitry 126 and the base-side control circuitry communicate with each other during the transfer of power between the base power-transfer apparatus 106, 108 and the vehicle power-transfer apparatus 124, as will be described in greater detail herein below.

As shown, the vehicle power-transfer apparatus 124 includes a wireless power transfer coil (e.g., vehicle-side wireless-power-transfer coil 128), and the vehicle-side control circuitry 126 is located in a different location on the vehicle 102 than the wireless-power-transfer coil 128. As with the base power-transfer apparatus 106, 108, this separation of the wireless-power-transfer coil 128 and the control circuitry 126 is a matter of engineering design or selection depending on the specifics of the installation. The control circuitry 126 may be supplied partly or wholly in the vehicle power-transfer apparatus 124 together with the wireless-power-transfer coil 128. In some vehicles it may be more convenient in terms of manufacture or servicing to combine the equipment and the wireless-power-transfer coil 128 in the power-transfer apparatus 124 whereas, in other vehicles, separate units may be more suitable. Similar considerations apply to the separation or co-location of the control circuitry and the wireless-power-transfer coils 110, 112 in the base power-transfer apparatus 106, 108.

Typically, the vehicle power-transfer apparatus 124 is located under the vehicle 102 near the front or rear of the vehicle 102. The exact location of the vehicle power-transfer apparatus 124 is typically determined when the vehicle 102 is being designed. This determination depends on a wide range of factors associated with the design of the vehicle 102, including the allocation of space to different functional units within the vehicle 102 that may have nothing to do with the WEVC function per se. The position may also depend on the physical size of the vehicle power-transfer apparatus 124, which depends on the amount of energy that the power-transfer apparatus is required to handle. This, in turn, is dependent to some extent on whether the vehicle is a hybrid electric vehicle with both a battery-powered motor and an internal combustion engine, or a (fully) electric vehicle where the only power source is electrical. Conveniently, the vehicle power-transfer apparatus 124 is placed on the vehicle 102 underneath and toward the front or rear of the vehicle 102 to facilitate positioning of the vehicle power-transfer apparatus 124 over the base power-transfer apparatus 106 or 108 during parking of the vehicle 102.

In use, the vehicle 102 is so positioned in a parking space that the vehicle power-transfer apparatus 124 is located over the base power-transfer apparatus 106, 108 in the parking space. When the vehicle 102 is parked as shown, with the vehicle power-transfer apparatus 124 placed over the base power-transfer apparatus 106, 108, wireless power transfer can be employed. Electrical energy in the form of an alternating current is delivered from the power supply 114 via the power link 116 to the base power-transfer apparatus 106 where it drives the wireless-power-transfer coil 110. This current causes the wireless-power-transfer coil 110 to create a magnetic field (Ampere's law). That field induces a voltage (Faraday's law) and an electric current in the wireless-power-transfer coil 128 in the vehicle power-transfer apparatus 124, which current is used to drive a load. The current is converted into a suitable form by the control circuitry 126 and used to charge the battery 104.

It should be appreciated that the system 100 shown in FIG. 1 is a static WEVC system in that the vehicle 102, once parked, remains in place over the base power-transfer apparatus 106, 108 during charging of the battery 104. Other wireless power-transfer systems for electric vehicles allow power transfer to occur while the vehicle is being driven along a road, picking up energy from a charging track that serves a similar function to the base power-transfer apparatus 106, 108. Such dynamic wireless electric vehicle power-transfer systems are well documented and, in the interest of brevity, are not described in any further detail herein.

Usually the wireless power-transfer system 100 is designed to transfer power from the power supply 114 via the power network 118 to the base power-transfer apparatus 106 or 108, and on to the vehicle power-transfer apparatus 124. However, because of the inherent way in which magnetic wireless power-transfer functions, power could also be transferred from the battery in the vehicle to the power network 118. Further description of the operation of the wireless power-transfer system 100 focuses on power transfer from the power supply 114 to the electric vehicle 102. It should, however, be noted while considering the following description that power transfer may also happen in the reverse direction. That is to say, power may be delivered from the battery 104 in the electric vehicle 102 via the wireless power-transfer units to the power supply 114 and out to the power network 118.

Figure 2:
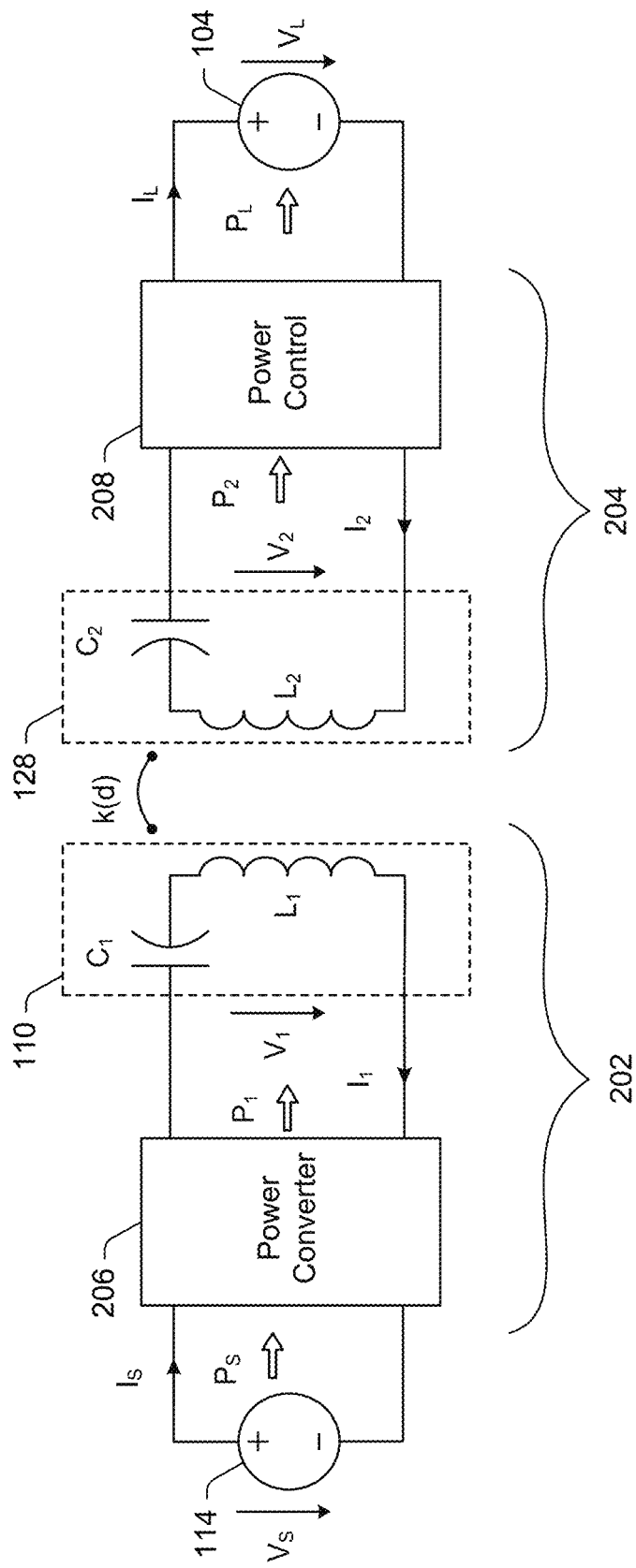
FIG. 2 illustrates a schematic diagram of electrical elements of the wireless power-transfer system of FIG. 1.

FIG. 2 is a schematic diagram of electrical elements of the wireless power-transfer system of FIG. 1. Electrically, the wireless power-transfer system (now renumbered as 200) comprises base-side circuitry 202 excluding the power supply 114 and including the base-side wireless-power-transfer coil 110, and vehicle-side circuitry 204 including the vehicle-side wireless-power-transfer coil 128 and excluding a load (e.g., the battery 104). The base-side circuitry 202 operates to convert energy from the power supply 114 into a suitable form to drive the base-side wireless-power-transfer coil 110. The vehicle-side circuitry 204 operates to control the application of energy received by the vehicle-side wireless-power-transfer coil 128 to the vehicle's battery 104.

Electrically, the base-side wireless-power-transfer coil 110 is represented by inductor $L_1$. The capacitor $C_1$ in series with the wireless-power-transfer coil $L_1$ (as shown) or in parallel (or another mix of parallel and series components) creates an LC circuit that resonates at a given frequency. This resonance helps to optimize power transfer between the wireless-power-transfer coils. Values of L and C are selected with the operating frequency of the WEVC system in mind. Similarly, the vehicle-side wireless-power-transfer coil 128 is represented by inductor $L_2$. The capacitor $C_2$ in series with the wireless-power-transfer coil $L_2$ (as shown) or in parallel (or another mix of parallel and series components) creates an LC circuit that resonates at a given frequency.

The power supply 114 supplies AC power $P_s$ to a base-side power converter 206. The AC power may be supplied at local power grid voltage levels $V_s$ (e.g., domestic levels of 110 V or 220 V at 60 Hz in the US and 220 V at 50 Hz in Europe, or industrial levels and polyphase supplies for higher power implementations). The base-side power converter 206 converts the incoming alternating current (AC) power to a power signal $P_1$ running at a system voltage $V_1$ and frequency to drive the base-side wireless-power-transfer coil 110. This may be achieved by first converting the signal from the power supply $P_s$ into a direct current (DC) signal and then using a converter such as an H-bridge (not shown) to convert the DC signal into the power signal $P_1$ for the wireless-power-transfer coil 110. WEVC systems may be operated at a range of operating frequencies around ~85 kHz. In one proposal, the permitted range is from 81.38 kHz to 90 kHz. Defining a range allows the system to operate at different frequencies depending on different alignment conditions, helping reduce detuning effects and hence improving system efficiency.

The base-side power converter 206 ensures that the output power signal $P_1$ is tuned and matched to the base-side wireless-power-transfer coil 110. Among other things this tuning and matching aims to optimize the efficiency at which power is transferred from the power supply 114 to the base-side wireless-power-transfer coil 110. The power signal has an associated current $I_1$ that flows in the wireless-power-transfer coil 110. This current $I_1$ causes the coil to create a magnetic field.

In use, when the base-side wireless-power-transfer coil 110 and the vehicle-side wireless-power-transfer coil 128 are in close proximity (e.g., the electric vehicle is parked with the wireless-power-transfer coils 110, 128 aligned and separated by an air gap of distance d) the magnetic field generated by the base-side wireless-power-transfer coil 110 couples with the vehicle-side wireless-power-transfer coil 128, as represented by k(d), the coupling factor at distance d. The magnetic field induces a voltage $V_2$ in the coil in the vehicle power-transfer apparatus 124 which creates a power signal $P_2$ including a current $I_2$. The current $I_2$ in the power signal $P_2$ is received by a vehicle-side power converter 208, which includes tuning and matching circuitry (illustrated by capacitor $C_2$) and power conversion circuitry that converts the current $I_2$ into a form suitable for the battery 104, e.g., DC current.

Different applications of wireless power transfer are designed to fulfill different operating conditions. Whether the operating frequency of the system 200 is chosen first and values of the capacitor $C_1$ and the inductor $L_1$ are selected accordingly, or whether the values of the capacitor $C_1$ and the inductor $L_1$ are chosen first and the operating frequency is selected accordingly is, in practice, an engineering decision. However, if the operating frequency becomes standardized at the aforementioned 85 kHz, that may become one governing value in designing the wireless-power-transfer coils 110, 128.

Although the wireless-power-transfer coil is primarily an inductor, it is made from a conductor that has an inherent resistance and inter-strand capacitance, with the turns of the coil also creating inter-turn capacitance. These inherent characteristics of the conductor contribute to the values of L and C in the base- and vehicle-side wireless-power-transfer coils 110, 128. In some circumstances, the inherent capacitance may be sufficient to provide the required capacitance without the need for separate components or elements. In other design situations, separate capacitors or other discrete components may prove necessary.

As for the form of the coil (e.g., base-side wireless-power-transfer coil 110, vehicle-side wireless-power-transfer coil 128), there are numerous configurations and topologies available for use. These include such single coil arrangements as a circular, square or polygonal where the coils are wound in a substantially planar form. The coil configurations and topologies also include solenoid arrangements, in which the coil is wound around a core, and bipolar arrangements which use a coil arrangement that achieves virtually zero coupling between different parts of the coil. Additional coil configurations and topologies include multi-coil arrangements, such as a double-D ("DD") coil where the conductor follows a convoluted path that is shaped like two letters "D" alongside each other. The D-shaped portions define pole areas in the coil that allow magnetic flux to be generated at a height above the coil where flux arches from one coil opening to the other coil opening (e.g., in an aspect horizontally polarized). Hybrid combinations of these are also available. Each configuration and topology offers advantages and disadvantages, and the decision of which to use depends on the application for which the system is designed.

Depending on the market, the equipment for the vehicle 102 (e.g., the vehicle power-transfer apparatus 124 and the vehicle-side control circuitry 126) and the equipment for the base (e.g., the base power-transfer apparatus 106 and the wireless-power-transfer coil 110, and the power supply 114) may be made and sold by different vendors to different customers. The vehicle equipment may be sold to automobile manufacturers for incorporation into the mass-production of an electric vehicle. Or, it may be sold directly to electric vehicle owners as an after-market option. Similarly, the base equipment may be supplied to automobile manufacturers for sale with a new electric vehicle or it may be made and sold directly to electric vehicle owners. Ongoing standardization efforts are directed, among other things, to ensuring interoperability of differently designed WEVC systems. The aim is for a vehicle from any automobile manufacturer to be able to work with base equipment from any other supplier, be they automobile manufacturers or others. These factors too need to be considered when designing a WEVC system for sale to customers.

Space is also a consideration. In some applications, e.g., the apparatus in a WEVC system, and despite the relatively high power levels involved, there is a desire to make the coils as small as possible in order not to take up large areas in parking spaces and not to add weight or take up space under the vehicle. It is simpler to design a coil where the loops are laid out in a single layer, with all the loops substantially in one plane. However, as power levels increase, the size of the coil necessary to handle the higher currents similarly increases. The size of the base power-transfer apparatus 106 is limited by the size of the vehicle 102. Compliance with emission limits, e.g., to confine the magnetic field to underneath the vehicle 102, may add further constraints. The size of the vehicle power-transfer apparatus 124 is similarly limited, but it is also constrained by other parts underneath the vehicle 102—the vehicle power-transfer apparatus 124 cannot interfere with the vehicle's suspension and steering, for example.

As with any transfer of energy, high efficiency is a desirable attribute. The efficiency is a measure of the difference between the power input to the system and the power delivered to the load. Energy lost during operation of a wireless power-transfer apparatus leads to greater operating costs. Losses may have an adverse effect on the apparatus as components age faster, reducing reliability and the useful life of the apparatus. The lost energy may also cause heating of the apparatus which, in the extreme and depending on the level of power transferred, may create a fire hazard or other safety concerns.

Naturally, the aim is to be as efficient as possible. The ideal of 100% efficiency cannot be achieved for various reasons. This is true of any system. For example, a resistive, e.g., wired, power-transfer system may achieve around 95-97% efficiency. Losses of 3-5% or more of the input power are the result of ohmic ($I^2R$) losses caused by current I flowing through conductors of resistance R. In a wireless power-transfer system, in addition to ohmic losses, further energy may be lost as a result of eddy currents in the conductor induced by the time-varying magnetic field. The conductors are typically made of copper and these losses in the conductor are sometimes referred to as 'copper losses.' Despite these losses, efficiencies of around 91-95% are nevertheless possible in wireless systems depending on their design.

Power losses occur to varying degrees throughout the system, e.g., in the power electronics, the conductors, and the ferrite. One consequence of these losses is that for a given level of power (e.g., 3 kW, 6 kW, 11 kW) components must be 'larger' than they would be in a wholly efficient system. It may prove necessary to select power electronics components that are able to handle more power, and to design coils that can carry more current. Putting more power or current through the system may have an adverse effect on the apparatus as components age faster, reducing reliability and the useful life of the apparatus. The larger components may be better able to handle the extra power, making the system more reliable than would be the case if 'smaller' components were used. All of this, however, adds to the size of the equipment and results in greater costs in obtaining such components as inverters and power switches.

The frequency at which WEVC systems are designed to operate (e.g., 85 kHz frequency) can lead to an undesirable effect known as the skin effect. This is the tendency of an alternating electric current (AC) to become distributed within a conductor such that the current density is largest near the surface of the conductor and decreases with greater depths in the conductor. The electric current flows mainly at the "skin" of the conductor, between the outer surface and a level called the skin depth. This skin effect causes the effective resistance of the conductor to increase at higher frequencies where the skin depth is smaller, thus reducing the effective cross-section of the conductor.

In many wireless power-transfer applications, Litz wire is used as the conductor forming the wireless-power-transfer coil. Litz wire consists of many thin wire strands, individually insulated and twisted or woven together, and with groups of twisted wires being further twisted together in a prescribed pattern. This structure is configured to mitigate the aforementioned skin effects. The Litz wire is wound to form a coil of a designed form or topology. One of the effects of generating a magnetic field is the exertion of a mechanical force individually and collectively on the strands and wires. That mechanical force can lead to movement of the strands and wires, which leads to further losses in the coil.

The Litz wire or other conductor may be part of a coil structure that typically includes a layer of ferrite or other magnetically permeable material (e.g., ferrite). The permeable layer interacts with the magnetic field from the conductors in order to guide the magnetic field in a desired direction by channeling magnetic flux of the magnetic field. A conductive backing plate, typically of aluminum, is usually included to provide further control over the magnetic field from the coil, which may create further losses as a result of eddy currents.

The efficiency at which the system operates is also dependent on alignment. Wireless-power-transfer coils are designed to accommodate inaccurate positioning (displacement) where the coils are not precisely aligned with one placed exactly over the other. In a WEVC system, the coils can comfortably accommodate both lengthwise and sideways displacement (x, y) of around 100-150 mm; more if a specific system so requires. They can also accommodate significant vertical separation (z), proposed as different Standards classes Z1 (100-150 mm), Z2 (140-210 mm) and Z3 (170-250 mm). However, even with this large tolerance, efficiency decreases as displacement increases.

Example Signal Injection Circuitry

Figure 3A:
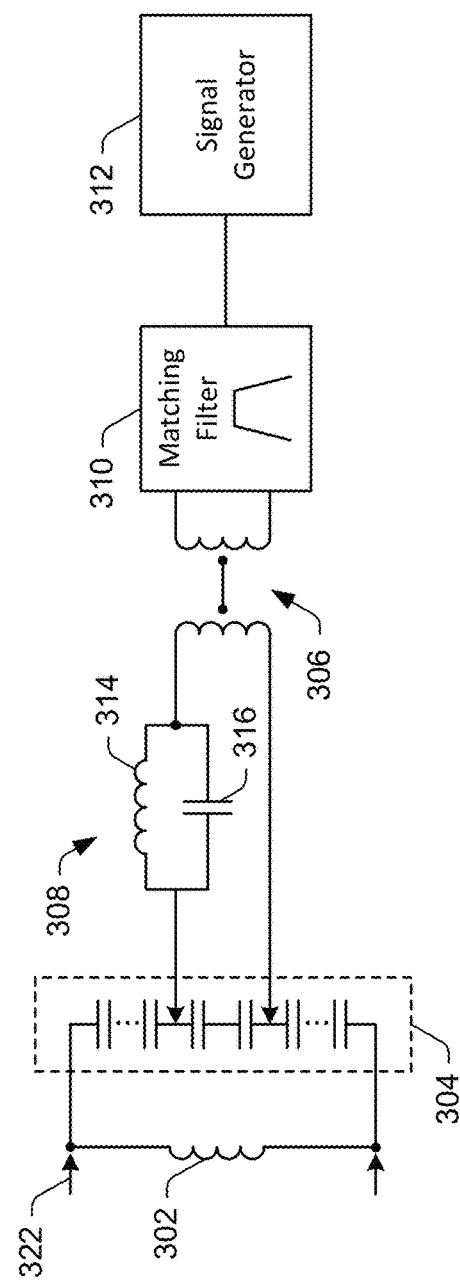
FIG. 3A illustrates an example signal injection circuit used to generate and inject a signal into a wireless-power-transfer coil of either a base power-transfer-apparatus or a vehicle power-transfer-apparatus.

An example hardware circuit (e.g., signal injection circuit 300) is described with respect to FIG. 3A that is used to generate and inject a signal into a wireless-power-transfer coil of either the base power-transfer apparatus or vehicle power-transfer apparatus. In particular, a signal is injected into a tuning capacitor (e.g., between a plurality of tuning capacitors) using the circuitry as will be further described below. This circuitry may be different than the power converter circuitry electrically coupled to the wireless-power-transfer coil (e.g., different than the inverter at the base power-transfer apparatus or rectifier/DC-DC conversion circuitry at the vehicle power-transfer apparatus). There may be a variety of different applications for a signal to be injected into the wireless-power-transfer coil. At least two examples are provided below with respect to a positioning beacon signal and a harmonics cancellation signal. However, other applications for a signal similar to those described may also be contemplated.

The example implementation described with respect to FIG. 3A uses a coupling transformer to couple into a portion of a tuning capacitor. The tuning capacitor may be built as a plurality of series or parallel connected capacitors (or some combination of series and parallel). As a result, different coupling points exist, e.g., between pairs of capacitors, that present different impedances. Thus, a suitable coupling point may be found to inject the desired signal into the wireless-power-transfer coil.

An inductor 302 represents a wireless-power-transfer coil, such as the base-side wireless-power-transfer coil 110 or the vehicle-side wireless-power-transfer coil 128 of FIG. 1. The signal injection circuit 300 can be built that either adds to the existing power electronics used for inductive power transfer, or that is more independent of it. A more independent circuit may be more modular and less impactful on the rest of the system. Tuning capacitors 304 represent a tuning capacitor, such as a tuning and matching circuitry, which includes a plurality of series and/or parallel connected tuning capacitors.

The signal injection circuit 300 includes a coupling transformer 306 coupled to a rejection filter 308 and the tuning capacitors 304 on one side (e.g., a high-voltage side). The opposing side of the coupling transformer 306 is a low-voltage side, in which the coupling transformer 306 is coupled to a matching filter 310. The matching filter 310 is also coupled to a signal generator 312 that generates a signal to be injected.

The rejection filter 308 in this example is an LC circuit that includes an inductor 314 and a parallel capacitor 316 tuned to the wireless power transfer frequency (e.g., 85 kHz). Because the tuning capacitors 304 include a plurality of capacitors, a coupling point exists between each pair of adjacent capacitors. Multiple coupling points exist when the tuning capacitors 304 include three or more capacitors. Different coupling points may have different impedances. Therefore, the rejection filter 308 and the coupling transformer 306 may be coupled to the tuning capacitors 304 at any suitable coupling point on the tuning capacitors 304.

In one example, the signal injection circuit 300 with respect to FIG. 3A may be used to generate a positioning beacon signal. For example, the signal injection circuit 300 may be a beacon transmitter circuit that is used to generate a beacon signal on the vehicle side that is detectable by a foreign object detection (FOD) system on the base side. The circuit allows for a suitable coupling point at the tuning capacitors to inject the FOD beacon signal into the inductor 302.

The beacon transmitter circuit is configured to provide a beacon signal on the vehicle side and allow reception of the beacon signal with an FOD system on the base side. In this case, the FOD system is configured to detect signaling based on the beacon signal and use the signaling to develop positioning information to, for example, determine a position of the wireless-power-transfer coil (inductor 302) relative to the FOD system (and relative to the base side therefore to eventually provide guidance for a vehicle for aligning over the base power-transfer apparatus). Other uses of the signal by the FOD system may also be contemplated. The inductor 302 on the vehicle side (e.g., vehicle-side wireless-power-transfer coil 128) can be used as a beacon transmitter antenna based on the current supplied to the inductor 302. In this way, a circuit can be built that either adds to the existing power electronics used for inductive power transfer, or that is more independent of it. A more independent circuit may be more modular and less impactful on the rest of the system. Tuning capacitors 304 represent a tuning capacitor, such as a tuning and matching circuitry, which includes a plurality of series and/or parallel connected tuning capacitors.

The beacon transmitter circuit includes a coupling transformer 306 coupled to a rejection filter 308 and the tuning capacitors 304 on one side (e.g., a high-voltage side). The opposing side of the coupling transformer 306 is a low-voltage side, in which the coupling transformer 306 is coupled to a matching filter 310. The matching filter 310 is also coupled to a signal generator 312 that generates signals, such as 120 kHz, usable as a beacon frequency. Resulting harmonics content of the beacon signal is sufficiently suppressed by the beacon transmitter circuit such that primarily a fundamental frequency is emitted by the beacon transmitter antenna (e.g., inductor 302).

The rejection filter 308 in this example is an LC circuit that includes an inductor 314 and a parallel capacitor 316 tuned to the wireless power transfer frequency (e.g., 85 kHz). Because the tuning capacitors 304 include a plurality of capacitors, a coupling point exists between each pair of adjacent capacitors. Multiple coupling points exist when the tuning capacitors 304 include three or more capacitors. Different coupling points may have different impedances. Therefore, the rejection filter 308 and the coupling transformer 306 may be coupled to the tuning capacitors 304 at any suitable coupling point on the tuning capacitors 304.

Figure 3B:
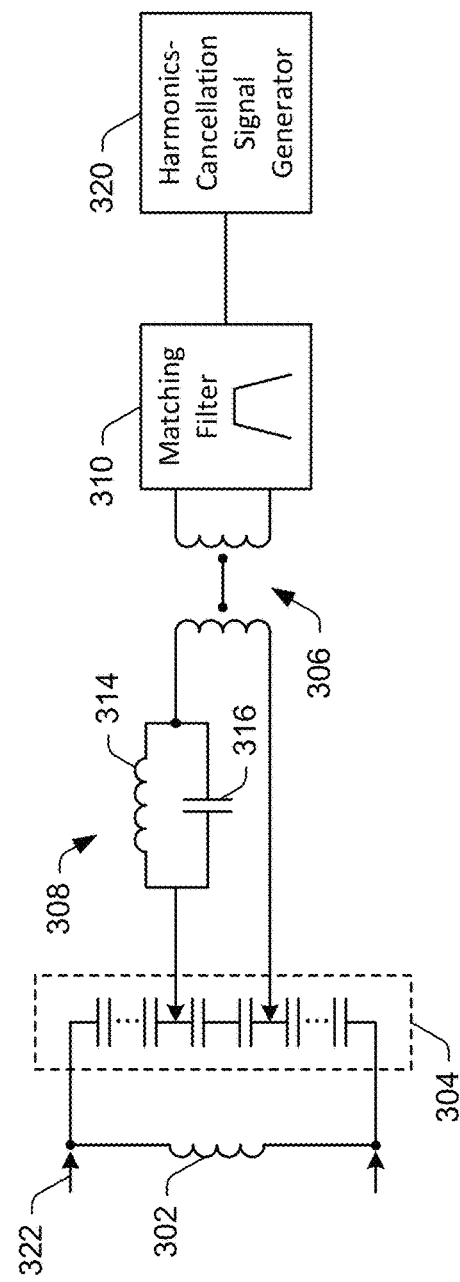
FIG. 3B illustrates an example implementation of a harmonics-cancellation circuit for cancelling harmonics components of an electric current in a wireless-power-transfer coil of a WEVC system.

FIG. 3B illustrates an example implementation 318 of harmonics-cancellation circuitry for cancelling harmonics components of an electric current in a wireless-power-transfer coil of a WEVC system. As described above with respect to FIG. 3A, the inductor 302 represents a wireless-power-transfer coil and the tuning capacitors 304 represent a tuning capacitor, such as a tuning and matching circuitry, which includes a plurality of series and/or parallel connected tuning capacitors. The harmonics-cancellation circuit includes the coupling transformer 306 coupled to the rejection filter 308 and the tuning capacitors 304 on one side (e.g., the high-voltage side). The opposing side of the coupling transformer 306 is the low-voltage side, in which the coupling transformer 306 is coupled to the matching filter 310. The matching filter 310 is also coupled to a harmonics-cancellation signal generator 320 that generates harmonics-cancellation signals.

In the base-side equipment, harmonics (represented by arrows 322 may be generated from a base-side power converter circuit (e.g., an inverter circuit) that converts a direct current (DC) to an alternating current (AC) for use in driving the base-side wireless-power-transfer coil 110 to generate the magnetic field. In the vehicle-side equipment, the harmonics may be generated based on a rectification process that converts AC current to DC current for charging a battery. The example implementation 300 of the harmonics-cancellation circuit can be implemented at the base-side equipment or the vehicle-side equipment, or both.

The rejection filter 308 prevents the fundamental signal component at the wireless power transfer frequency (e.g., 85 kHz signal) in the wireless-power-transfer coil (e.g., inductor 302) from passing through the coupling transformer 306 into the harmonics-cancellation signal generator 320 in FIG. 3B or into the signal generator 312 of FIG. 3A. The coupling transformer 306 may also attenuate the fundamental signal in the wireless-power-transfer coil while simultaneously coupling the cancellation signal from the harmonics-cancellation signal generator 320, or the beacon signal from the signal generator 312, into the tuning capacitors 304.

The matching filter 310 may include any suitable element(s) performing impedance matching functionality.

The matching filter 310 is configured to provide a relatively or substantially constant impedance to the signal generator 312 or the harmonics-cancellation signal generator 320. In addition, the matching filter 310 can approximately match the impedance at the coupling point to enable large amplitudes of harmonics to be injected into the coupling transformer 306. The matching filter 310 also removes the high frequency switching signal, which is generated by the harmonics-cancellation signal generator 320, and only passes the filtered (smoothed) cancellation signal into the tuning capacitors. The matching filter 310 may be configured to inject a cancellation signal including components, e.g., up to the $7^{th}$ order harmonics (e.g., 700 kHz) into the tuning capacitors.

The harmonics-cancellation signal generator 320 (also referred to as a "controller") generates a cancellation signal to reduce a number of harmonics components in the current of the wireless-power-transfer coil. The harmonics-cancellation signal generator 320 may include a driver, such as a full-bridge driver, a simple half-bridge driver (e.g., two switching transistors), or any other suitable driver. The half-bridge switches at high frequency and generates a harmonics-cancellation signal by using pulse-width modulation (PWM) of a high frequency switching signal (e.g., 4 MHz). The PWM switching frequency should be substantially higher than the frequency of the highest order harmonics to be cancelled. Alternatively, the PWM frequency may be substantially higher than the cut-off frequency of the matching filter to provide sufficient suppression of the PWM switching frequency. As described above, the matching filter 310 is configured to remove the high frequency switching signal and enable the resultant waveform of the injected harmonics cancellation signal to be as smooth as possible. The harmonics-cancellation signal generator 320 generates a cancellation signal that is pulse-width modulated and includes the harmonics that are to be cancelled in the current of the wireless-power-transfer coil. Some example harmonics in the cancellation signal may include $2^{nd}$ order harmonics up to $7^{th}$ order harmonics. Accordingly, using the techniques described herein, up to $7^{th}$ order harmonics may be generated using a simple half-bridge inverter. However, a full-bridge inverter may be alternatively be used. When implemented at the base side, the harmonics from the inverter are determined and used to generate the cancellation signal. When implemented at the vehicle side, harmonics from the rectifier are determined and used to generate the cancellation signal.

Example Methods

Figure 4:
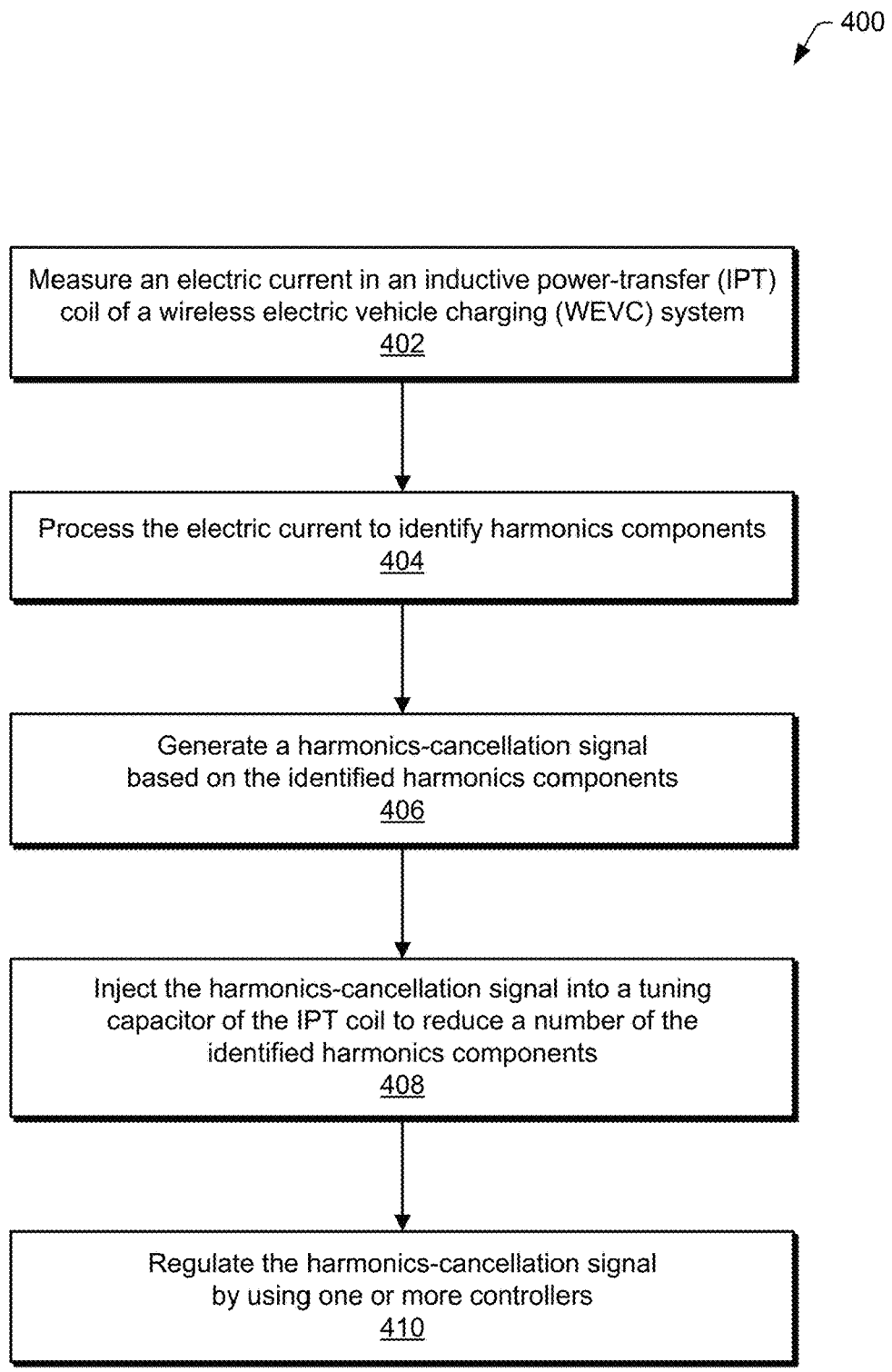
FIG. 4 describes example procedures for active harmonics cancellation in a WEVC system.

FIG. 4 describes example procedures for active harmonics cancellation in a wireless electric vehicle charging (WEVC) system. The example procedures may be employed in the implementations and systems described with respect to FIGS. 1-3, and/or any other suitable environment. The steps described for the various procedures can be implemented automatically and independent of user interaction. The orders in which operations of these procedures are shown and/or described are not intended to be construed as a limitation, and any number or combination of the described procedure operations can be combined in any order to implement a method, or an alternate method.

At 402, an electric current is measured in a wireless-power-transfer coil of the WEVC system. An existing foreign object detection system integrated with the WEVC system may be used for magnetic field sensing and signal processing. Alternatively or in addition, one or more current or voltage sensors can be used to measure the current or voltage, respectively, in the wireless-power-transfer coil.

At 404, the electric current is processed to identify harmonics components. In one example, the wireless-power-transfer coil is part of vehicle-side equipment of the WEVC system and the harmonics components are generated by a rectification process at the vehicle-side equipment of the WEVC system. In another example, the wireless-power-transfer coil is part of base-side equipment of the WEVC system and the harmonics components are generated by the base-side power converter (e.g., an inverter circuit). The harmonics components may include a variety of different order harmonics, such as any order from $2^{nd}$ order harmonics to $7^{th}$ order harmonics. As mentioned, an existing foreign object detection system integrated with the WEVC system may be used for signal processing. Alternatively or in addition, the harmonics-cancellation circuit can process the electric current to identify the harmonics components in the electric current of the wireless-power-transfer coil.

At 406, a harmonics-cancellation signal is generated based on the identified harmonics components. In aspects, generating the harmonics-cancellation signal includes the harmonics-cancellation circuit producing antiphase signal components that correspond to the identified harmonics components. In at least some implementations, the cancellation signal is a pulse-width modulated signal.

At 408, the harmonics-cancellation signal is injected into a tuning capacitor of the wireless-power-transfer coil to reduce a number of the identified harmonics components. By injecting the harmonics-cancellation signal (e.g., antiphase signal components), at least some of the harmonics components are canceled or reduced based on the resulting destructive interference.

At 410, the antiphase signal components in the harmonics-cancellation signal are regulated by using one or more controllers. For example, a controller can regulate the antiphase signal components by adjusting magnitude and/or phase of the antiphase components of the harmonics-cancellation signal to nullify or at least reduce the harmonics components in the current of the wireless-power-transfer coil based on destructive interference.

Example Wireless Power-Transfer System

Figure 5:
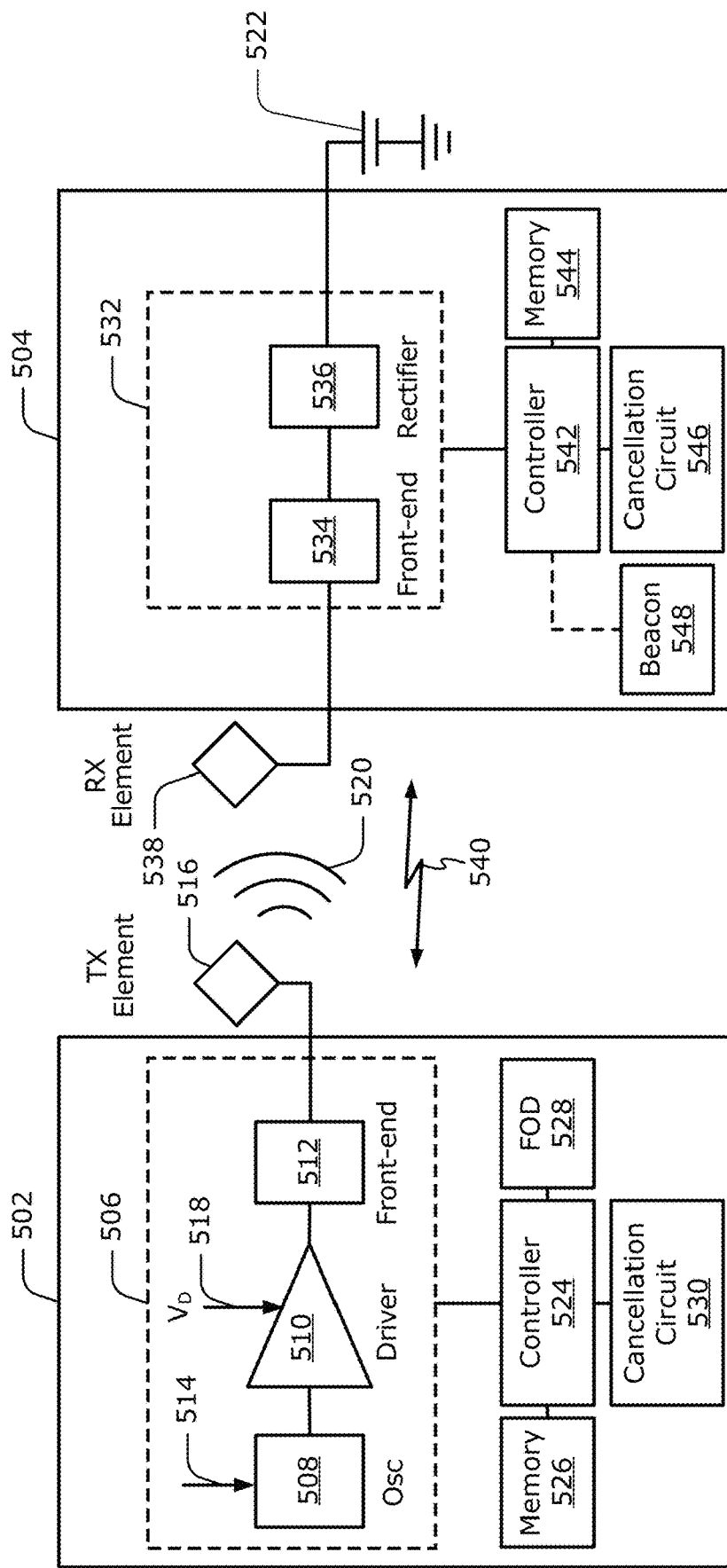
FIG. 5 illustrates an example wireless power-transfer system.

FIG. 5 illustrates an example wireless power-transfer system 500, which includes components capable of implementing aspects of active harmonics cancellation. The system 500 includes a transmitter 502 and a receiver 504. The transmitter 502 may include transmit circuitry 506 having an oscillator 508 (e.g., inverter), a driver circuit 510, and a front-end circuit 512. The oscillator 508 may be configured to generate an oscillator signal at a desired frequency that may adjust in response to a frequency control signal 514. The oscillator 508 may provide the oscillator signal to the driver circuit 510. The driver circuit 510 may be configured to drive the power transmitting element 516 at, for example, a resonant frequency of the power transmitting element 516 based on an input voltage signal (VD) 518.

The front-end circuit 512 may include a filter circuit configured to filter out harmonics or other unwanted frequencies. The front-end circuit 512 may include a matching circuit configured to match the impedance of the transmitter 502 to the impedance of the power transmitting element 516. The front-end circuit 512 may include also a tuning circuit to create a resonant circuit with the power transmitting element 516. As a result of driving the power transmitting element 516, the power transmitting element 516 may generate a wireless field 520 to wirelessly output power at a level sufficient for charging a battery 522, or otherwise powering a load.

The transmitter 502 may further include a controller 524 operably coupled to the transmit circuitry 506 and configured to control one or more aspects of the transmit circuitry 506, or accomplish other operations relevant to active harmonics cancellation. The controller 524 may be a microcontroller or a processor. The controller 524 may be implemented as an application-specific integrated circuit (ASIC). The controller 524 may be operably connected, directly or indirectly, to each component of the transmit circuitry 506. The controller 524 may be further configured to receive information from each of the components of the transmit circuitry 506 and perform calculations based on the received information. The controller 524 may be configured to generate control signals (e.g., the control signal 514) for each of the components that may adjust the operation of that component. As such, the controller 524 may be configured to adjust or manage the inductive power-transfer based on a result of the operations it performs. The transmitter 502 may further include a memory 526 configured to store data, for example, such as instructions for causing the controller 524 to perform particular functions, such as those related to management of wireless power-transfer and/or foreign object detection and positioning.

The transmitter 502 may also include a foreign object detection (FOD) circuit 528. The FOD circuit 528 is coupled to the controller 524 and is configured to communicate with the controller 524. The controller 524 is configured to control the FOD circuit 528. The FOD circuit 528 may be coupled to one or more sensor circuits (not shown), which may detect a foreign object within the magnetic field of the wireless field 520, such as a metal object, or the electric vehicle 102 of FIG. 1, as described above. In aspects, each sense coil is configured to transmit a detection signal indicative of detecting the foreign object within its sensing area. The FOD circuit 528 then communicates the detection signals to the controller 524, which is configured to determine a position of the foreign object relative to one or more of the FOD sense coils based on the detection signals.

The transmitter 502 may also include a cancellation circuit 530 coupled to the controller 524 and to one or more antenna circuits (not shown). The controller 524 is configured to control the cancellation circuit 530. The cancellation circuit 530 is configured to generate a harmonics-cancellation signal to reduce harmonics currents levels in the power transmitting element 516. The cancellation circuit 530 may be integrated into the power transmitting element 516, or any other region of the base power-transfer apparatus 106 or the components thereof.

The receiver 504 may include receive circuitry 532 having a front-end circuit 534 and a rectifier circuit 536. The front-end circuit 534 may include matching circuitry configured to match the impedance of the receive circuitry 532 to the impedance of the power receiving element 538. The front-end circuit 534 may further include a tuning circuit to create a resonant circuit with the power receiving element 538. The rectifier circuit 536 may generate a DC power output from an alternating current (AC) power input to charge the battery 522, or provide power to some other load. The receiver 504 and the transmitter 502 may additionally communicate on a separate communication channel 540, e.g., Bluetooth™, ZigBee™, and cellular. The receiver 504 and the transmitter 502 may alternatively communicate via in-band signaling using characteristics of the wireless field 520.

Further, the receiver 504 may be configured to determine whether an amount of power transmitted by the transmitter 502 and received by the receiver 504 is appropriate for charging the battery 522 or powering a load. In certain embodiments, the transmitter 502 may be configured to generate a predominantly non-radiative field with a direct field coupling coefficient (k) for providing energy transfer. The receiver 504 may directly couple to the wireless field 520 and may generate an output power for storing or consumption by the battery 522 (or load), coupled to the output of the receive circuitry 532.

The receiver 504 may further include a controller 542 configured similarly to the transmit controller 524 as described above for one or more wireless power management aspects of the receiver 504. The receiver 504 may further include a memory 544 configured to store data, such as instructions for causing the controller 542 to perform particular functions, such as those related to active harmonics cancellation. The power transmitting element 516 and the power receiving element 538 may be separated by a distance and configured according to a mutual resonant relationship to minimize transmission losses between the transmitter 502 and the receiver 504.

The power transmitting element 516 and the power receiving element 538 may correspond to or be included as part of, respectively, the transmitter 502, the base-side wireless-power-transfer coil 110, and/or the vehicle-side wireless-power-transfer coil 128 that utilize techniques for active harmonics cancellation described herein.

The receiver 504 may also include a cancellation circuit 546 coupled to the controller 542 and to one or more antenna circuits (not shown). The controller 542 is configured to control the cancellation circuit 546. The cancellation circuit 546 is configured to generate a harmonics-cancellation signal to reduce harmonics currents levels in the power receiving element 538. The cancellation circuit 546 may be integrated into the power receiving element 538, or any other region of the electric vehicle 102 or the components thereof.

The receiver 504 may also include a beacon circuit 548 (e.g., beacon transmitter circuit illustrated in example implementation 300) coupled to the controller 542 circuit and to one or more antenna circuits (not shown). The controller 542 is configured to control the beacon circuit 548. The beacon circuit 548 is configured to control the one or more antenna circuits. The beacon circuit 548 may be integrated into the power receiving element 538, or any other region of the electric vehicle 102 or the components thereof.

In an exemplary implementation, the controller 542 is configured to control the beacon circuit 548 by sending control signals to the beacon circuit 548. The beacon circuit 548 is configured to change electrical characteristics of the antenna in response to the controller's 542 control signals. For example, the beacon circuit 548 can modulate, vary, or modify one or more electrical characteristics of the antenna in response to the controller's 542 control signals. In aspects, the beacon circuit 548 can impart a distinctive modulation onto the electrical characteristic of the antenna to create a beacon (e.g., modulated signal), and the distinct modulation pattern may be used by the FOD circuit 528 and controller 524 to uniquely identify the beacon from another foreign object. In at least some aspects, the beacon circuit 548 can inject an electric current into an inductive power transfer (IPT) coil (e.g., the vehicle-side wireless-power-transfer coil 128 or another IPT coil on the electric vehicle 102) to cause the IPT coil to act as a beacon transmission antenna, which can be detected by the FOD circuit 528 in the transmitter 502 and used to obtain positioning information of the IPT coil.

The various illustrative logical blocks, modules, circuits, and method steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the described aspects.

The various illustrative blocks, modules, and circuits described in connection with the aspects disclosed herein may be implemented or performed with a general purpose hardware processor, a Digital Signal Processor (DSP), an Application-Specific Integrated Circuit (ASIC), a Field Programmable Gate Array (FPGA) or other programmable logic device, discrete gate or transistor logic, discrete hardware components, or any combination thereof designed to perform the functions described herein. The general purpose hardware processor may be a microprocessor, but in the alternative, the hardware processor may be any conventional processor, controller, microcontroller, or state machine. The hardware processor may also be implemented as a combination of computing devices, e.g., a combination of a DSP and a microprocessor, a plurality of microprocessors, one or more microprocessors in conjunction with a DSP core, or any other such configuration.

The steps of a method and functions described in connection with the aspects disclosed herein may be embodied directly in hardware, in a software module executed by a hardware processor, or in a combination of the two. If implemented in software, the functions may be stored on or transmitted as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the hardware processor such that the hardware processor can read information from, and write information to, the storage medium. In the alternative, the storage medium may be integral to the hardware processor. Disk and disc, as used herein, includes compact disc (CD), laser disc, optical disc, digital versatile disc (DVD), floppy disk and Blu-ray™ disc where disks usually reproduce data magnetically, while discs reproduce data optically with lasers. Combinations of the above should also be included within the scope of computer-readable media. The hardware processor and the storage medium may reside in an ASIC.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. A wireless charging apparatus comprising:
a wireless-power transfer circuit comprising:
a wireless-power transfer coil configured to generate or couple to a magnetic field to transfer or receive power; and
a plurality of tuning capacitors electrically coupled to the wireless-power transfer coil;
a power converter circuit electrically coupled to the wireless-power transfer circuit; and
a signal generation circuit different from the power converter circuit and electrically coupled to one or more nodes between capacitors of the plurality of tuning capacitors, the signal generation circuit configured to generate and inject a signal into the wireless-power transfer circuit at the one or more nodes between the capacitors of the plurality of tuning capacitors, the signal generation circuit comprising:
a rejection filter tuned to an operating frequency of the wireless-power transfer coil; and
a coupling transformer having:
a high-voltage side coupled to the rejection filter and at least one of the nodes between the capacitors of the plurality of tuning capacitors; and
a low-voltage side coupled to a harmonics-cancellation signal generator that generates a cancellation signal to reduce a number of harmonics components in an electric current of the wireless-power transfer coil, the cancellation signal comprising antiphase signal components.

2. The wireless charging apparatus of claim 1, wherein the coupling transformer is:
configured to reject back firing of a fundamental operating frequency of the wireless-power transfer coil.

3. The wireless charging apparatus of claim 1, wherein the signal generation circuit comprises the harmonics-cancellation signal generator.

4. The wireless charging apparatus of claim 3, wherein the harmonics-cancellation signal generator is configured to adjust one or more of a magnitude or a phase of the cancellation signal.

5. The wireless charging apparatus of claim 3, wherein the harmonics-cancellation signal generator comprises a half-bridge driver or a full-bridge driver.

6. The wireless charging apparatus of claim 3, wherein:
the signal generation circuit further comprises:
a matching filter electrically coupled to the coupling transformer and the harmonics-cancellation signal generator;
the harmonics-cancellation signal generator comprises a driver that uses pulse-width modulation; and
the matching filter removes a switching frequency of the driver.

7. The wireless charging apparatus of claim 3, further comprising one or more current or magnetic field sensors to measure at least one of a magnitude or a phase of the harmonics components of the electric current in the wireless-power transfer coil.

8. The wireless charging apparatus of claim 1, wherein the power converter circuit comprises a rectifier or an inverter.

9. The wireless charging apparatus of claim 1, wherein the signal generation circuit is configured to modulate the signal to provide a modulated signal that is detectable by a foreign object detection (FOD) system at another power-transfer apparatus for determining positioning information of the wireless-power transfer coil relative to the FOD system.

10. A base wireless charging apparatus comprising:
a wireless-power-transfer coil configured to generate a magnetic field based on an electric current running through the wireless-power-transfer coil operable to transfer power to a wireless-power receiver device; and
harmonics-cancellation circuitry comprising:
a rejection filter coupled to a tuning capacitor of the wireless-power-transfer coil, the rejection filter tuned to an operating frequency of the wireless-power-transfer coil;
a coupling transformer having a high-voltage side and a low-voltage side that is opposite the high-voltage side, the high-voltage side of the coupling transformer coupled to the rejection filter and the tuning capacitor, the coupling transformer configured to couple a cancellation signal into the tuning capacitor of the wireless-power-transfer coil; and
a harmonics-cancellation signal generator coupled to the low-voltage side of the coupling transformer, the harmonics-cancellation signal generator configured to generate the cancellation signal to reduce a number of harmonics components in the electric current of the wireless-power-transfer coil, the cancellation signal comprising antiphase signal components.

11. The base wireless charging apparatus of claim 10, wherein:
the tuning capacitor comprises a plurality of connected capacitors; and
the rejection filter is electrically coupled to one or more nodes between capacitors of the plurality of connected capacitors; and
the coupling transformer is electrically coupled to one or more additional nodes between the capacitors of the plurality of connected capacitors and configured to inject the cancellation signal into the tuning capacitor of the wireless-power-transfer coil at the one or more additional nodes.

12. The base wireless charging apparatus of claim 10, wherein the harmonics-cancellation signal generator is configured to adjust one or more of a magnitude or a phase of the cancellation signal.

13. The base wireless charging apparatus of claim 10, wherein the harmonics-cancellation circuitry further comprises a matching filter coupled to the coupling transformer and the harmonics-cancellation signal generator, the matching filter configured to provide a substantially constant impedance to the harmonics-cancellation signal generator.

14. The base wireless charging apparatus of claim 10, wherein the harmonics-cancellation circuitry further comprises a matching filter coupled to the coupling transformer and the harmonics-cancellation signal generator, the matching filter configured to remove a switching frequency of the harmonics-cancellation signal generator and pass the harmonics components into the tuning capacitor.

15. The base wireless charging apparatus of claim 14, wherein the harmonics-cancellation signal generator comprises a half-bridge driver or a full-bridge driver.

16. The base wireless charging apparatus of claim 14, wherein the harmonics-cancellation signal generator comprises a driver that uses pulse-width modulation, and wherein the matching filter removes the switching frequency of the driver.

17. The base wireless charging apparatus of claim 10, wherein the tuning capacitor comprises a plurality of series or parallel connected capacitors.

18. The base wireless charging apparatus of claim 10, further comprising one or more current or magnetic field sensors configured to measure at least one of a magnitude or a phase of the harmonics components of the electric current in the wireless-power-transfer coil.

19. The base wireless charging apparatus of claim 10, wherein the harmonics-cancellation circuit is configured to:
   measure the electric current in the wireless-power-transfer coil;
   process the electric current to identify the harmonics components;
   generate the antiphase signal components; and
   regulate the antiphase signal components by using one or more controllers.

20. A vehicle wireless charging apparatus comprising:
   a wireless-power-transfer coil configured to receive a magnetic field and generate an electric current based on the magnetic field;
   a rectifier coupled to the wireless-power-transfer coil, the rectifier configured to convert the electric current in the wireless-power-transfer coil to a direct current for charging a battery; and
   harmonics-cancellation circuitry comprising:
      a rejection filter coupled to a tuning capacitor of the wireless-power-transfer coil, the rejection filter tuned to an operating frequency of the wireless-power-transfer coil;
      a coupling transformer having a high-voltage side and a low-voltage side that is opposite the high-voltage side, the high-voltage side of the coupling transformer coupled to the rejection filter and the tuning capacitor, the coupling transformer configured to suppress a fundamental operating frequency of the wireless-power-transfer coil and couple a cancellation signal into the tuning capacitor; and
      a harmonics-cancellation signal generator coupled to the low-voltage side of the coupling transformer, the harmonics-cancellation signal generator configured to generate the cancellation signal to reduce a number of harmonics components in the electric current of the wireless-power-transfer coil, the cancellation signal comprising antiphase signal components.

21. The vehicle wireless charging apparatus of claim 20, wherein the harmonics-cancellation signal generator is configured to adjust one or more of a magnitude or a phase of the cancellation signal.

22. The vehicle wireless charging apparatus of claim 20, wherein the harmonics-cancellation circuitry further comprises a matching filter coupled to the coupling transformer and the harmonics-cancellation signal generator, the matching filter configured to provide a substantially constant impedance to the harmonics-cancellation signal generator.

23. The vehicle wireless charging apparatus of claim 20, wherein the harmonics-cancellation circuitry further comprises a matching filter coupled to the coupling transformer and the harmonics-cancellation signal generator, the matching filter configured to remove a switching frequency of the harmonics-cancellation signal generator and pass the harmonics components into the tuning capacitor.

24. The vehicle wireless charging apparatus of claim 23, wherein the harmonics-cancellation signal generator comprises a half-bridge driver.

25. The vehicle wireless charging apparatus of claim 24, wherein the half-bridge driver uses pulse-width modulation and the matching filter removes the switching frequency of the half-bridge driver.

26. The vehicle wireless charging apparatus of claim 20, wherein:
   the tuning capacitor comprises a plurality of connected capacitors; and
   the rejection filter is electrically coupled to one or more nodes between capacitors of the plurality of connected capacitors; and
   the coupling transformer is electrically coupled to one or more additional nodes between the capacitors of the plurality of connected capacitors and configured to couple the cancellation signal into the tuning capacitor of the wireless-power-transfer coil at the one or more additional nodes.

27. The vehicle wireless charging apparatus of claim 20, further comprising one or more sensors configured to measure the electric current of the wireless-power-transfer coil.

28. The vehicle wireless charging apparatus of claim 20, wherein the harmonics-cancellation circuit is configured to:
   measure the electric current in the wireless-power-transfer coil;
   process the electric current to identify the harmonics components;
   generate the antiphase signal components; and
   regulate the antiphase signal components by using one or more controllers.

29. A method for active harmonics cancellation in a wireless electric vehicle charging (WEVC) system, the method comprising:
   measuring an electric current in a wireless-power-transfer coil of the WEVC system;
   processing the electric current to identify harmonics components;
   generating a harmonics-cancellation signal based on the identified harmonics, the harmonics-cancellation signal comprising antiphase signal components;
   suppressing a fundamental operating frequency of the electric current in the wireless-power-transfer coil using a coupling transformer having a low-voltage side coupled to a signal generator that generates the harmonics-cancellation signal and a high-voltage side coupled to a tuning capacitor of the wireless-power-transfer coil; and
   injecting the harmonics-cancellation signal into the tuning capacitor of the wireless-power-transfer coil to reduce a number of the identified harmonics components.

30. The method of claim 29, further comprising adjusting at least one of a magnitude or a phase of the antiphase components of the harmonics-cancellation signal to reduce the identified harmonics components in the electric current of the wireless-power-transfer coil based on destructive interference.

* * * * *